United States Patent [19]

Lembo

[11] Patent Number: 5,583,516
[45] Date of Patent: Dec. 10, 1996

[54] WAVELENGTH-SELECTABLE OPTICAL SIGNAL PROCESSOR

[75] Inventor: Lawrence J. Lembo, Torrance, Calif.

[73] Assignee: TRW Inc., Redondo Beach, Calif.

[21] Appl. No.: 185,744

[22] Filed: Jan. 24, 1994

[51] Int. Cl.$^6$ ........................... H01Q 3/22
[52] U.S. Cl. ............ 342/375; 342/372; 324/76.36; 250/227.12
[58] Field of Search ............... 342/375, 158, 342/372; 324/76.36; 250/227.12; 359/140, 130

[56] References Cited

U.S. PATENT DOCUMENTS

| | | | |
|---|---|---|---|
| 4,814,774 | 3/1989 | Herczfeld | 342/372 |
| 5,051,754 | 9/1991 | Newberg | 342/375 |
| 5,231,405 | 7/1993 | Riza | 342/375 |
| 5,325,102 | 6/1994 | Page | 342/375 |
| 5,339,186 | 8/1994 | Weverka | 359/140 |
| 5,361,156 | 11/1994 | Pidgeon | 359/161 |
| 5,367,305 | 11/1994 | Volker et al. | 342/368 |
| 5,375,004 | 12/1994 | Ogura | 359/139 |

Primary Examiner—Thomas H. Tarcza
Assistant Examiner—Dao L. Phan

[57] ABSTRACT

A wavelength-selectable optical signal processor for creating a predetermined optical delay pattern in a signal. The system includes a succession of optical delay pathways each receiving a portion of a modulated optical beam having a predetermined wavelength. The distance each beam traverses through each delay pathway varies as a function of the predetermined wavelength of the optical beam. As a result, the distance of the optical path for any of the predetermined wavelengths creates a predetermined delay pattern across the succession of optical delay pathways. In signal processing applications the delayed optical beam can be recombined in the time domain to construct a superposition of time delayed signals yielding an agile signal processor implemented using a wavelength-reconfigurable transversal filter design. In a phased-array antenna, the present invention results in a time delay network which establishes a one-to-one correspondence between antenna beam direction and optical carrier wavelength. This permits an antenna to change beam direction simply by changing the wavelength of the optical carrier.

23 Claims, 5 Drawing Sheets

WAVELENGTH-SELECTABLE OPTICAL SIGNAL PROCESSOR

BACKGROUND OF THE INVENTION

1. Technical Field

The present invention relates to optical signal processing, and more particularly to an optical signal processing method and apparatus which produces a predetermined pattern of time delays in a signal.

2. Discussion

The introduction of a predetermined time delay into a signal is an important function in many optical and electrical systems. One technique for providing time delay is known as phase shifting. However, phase shifting cannot be utilized for continuous wave signals with finite bandwidth nor for pulse digital applications; for these types of signals true time delay is necessary.

True time delay is typically generated in an optical signal by a set of optical fibers of different lengths, in conjunction with a switching mechanism to select the fiber of the proper length. However, these types of delay generators have significant problems associated with the large insertion loss of the "one to many" switching mechanism and the large number of fibers necessary for achieving a wide range of optical delays. Further, such delay units require active switching which requires active control signals and drive electronics that add significantly to the overall complexity, bulk and cost of the system. control signals and drive electronics that add significantly to the overall complexity, bulk and cost of the system.

One important application for delay elements is in RF phased-array antennas. In general, antenna beam steering is accomplished by a combination of true time delay and pure phase shifting. Each steering technique may in principle, be implemented either with optical or conventional electronic hardware. Broad band phased-array antennas require true time delayed devices positioned at each antennas subarray to limit the effects of beam squint. Beam squint is the most significant bandwidth limiting effect in phased-array antennas that require wide angle scanning. "Squint," is a phenomena where an antenna points in different directions for different frequencies within the bandwidth of the antenna. Conventional RF phased-array antennas achieve true time delay by using switched lengths of co-axial cable or waveguide. A control system must then calculate, based on the required antenna beam direction, the requisite time delays for each time-delay unit. Control signals are distributed to the subarrays, where the proper length of cable is switched into place. Present optical true time delay approaches mimic the conventional RF approach. Also, conventional phased array RF antennas become very lossy at high RF frequencies. Thus, there is a need for exploiting the intrinsic low loss propagation properties of optical fiber and implementing true time delay using optical approaches.

In one optical implementation, binary-length fiber segments are switched in or out of a given delay path to realize the required time delay. In another implementation, the optical signal is split into fiber paths of all possible desired delay lengths; the signal path of the desired length is enabled and the others are suppressed. Either of these schemes are plagued by significant insertion losses, physical bulk, and the continued reliance on a complex electronic control network. Furthermore due to these disadvantages, the ability to alter the time delay to change beam direction is hindered.

In addition to the phased-array antenna application, similar problems occur in optical processors relying on coherent techniques such as phase quadrature. Phase shifters will impart the proper shift only for a limited bandwidth of frequencies. Other signal processing techniques requiring substantial time delays, such as auto correlation, will also be severely limited in bandwidth if phase-only techniques are utilized. True time delay is also essential in digital applications such as optical clock distribution in large reconfigurable electronic circuitry. Phase is not well defined in a digital pulse train unless it is of constant frequency (f). Phase shifting of such pulse trains will only work for time delays up to $1/f$. Phase shifting of pulse trains is usually accomplished by true time delaying the pulse train.

Thus, it would be desirable to provide an apparatus for producing variable true time delay in an optical signal without requiring active switching and without high insertion loss. Accordingly, it would be desirable to provide a technique for producing true time delay in an optical signal which is generally passive in operation. Providing these features in an apparatus which is not limited in RF bandwidth would also be desirable. It would also be desirable to provide a system for easily and rapidly changing a delay pattern in a signal, for example, to facilitate beam steering in a phased-array antenna. In addition, it would be desirable to provide such a true time delay system which is relatively simple, compact and inexpensive.

SUMMARY OF THE INVENTION

Pursuant to the present invention an apparatus is provided which is capable of producing a true time delay pattern in an optical signal. In a first aspect of the present invention the apparatus comprises a plurality of input means each receiving an identical portion of a modulated optical beam, the optical beam having a predetermined wavelength. A succession of optical delay pathways are each coupled to one of the input means, wherein the distance each beam transverses through each delay pathway is a function of the wavelength of the optical beam. Also, the distance for any one of the wavelengths creates a predetermined delay pattern across the succession of optical delay pathways. The result is a passive low cost true time delay system with minimal signal loss.

When used in a phased-array antenna, the present invention results in a time delay network which establishes a one-to-one correspondence between antenna beam direction and optical carrier wavelength. In this way the invention allows the antenna beam to be steered simply by changing the optical carrier wavelength. In signal processing applications, the delayed optical beams can be recombined in the time domain to construct a superposition of time-delayed signals. The result is an agile signal processor implemented using a wavelength-reconfigurable transversal filter design.

BRIEF DESCRIPTION OF THE DRAWINGS

The various advantages of the present invention will become apparent to one skilled in the art by reading the following specification and by reference to the following drawings in which.

DESCRIPTION OF THE PREFERRED EMBODIMENTS

Figure 1:
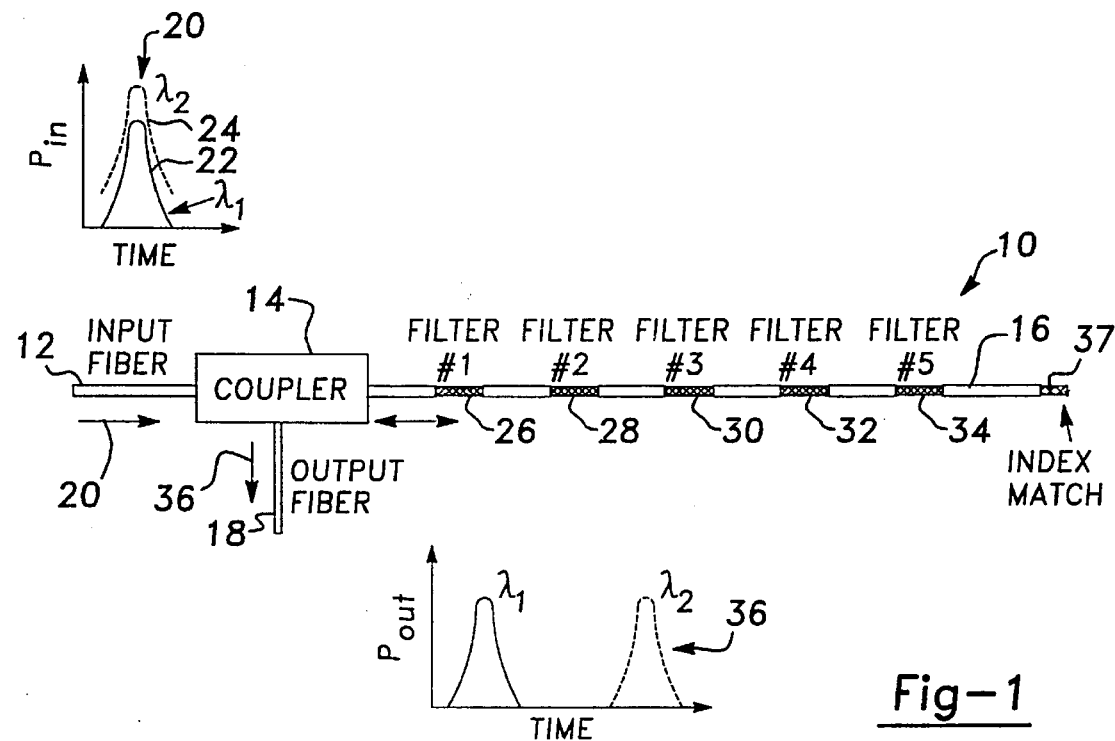
FIG. 1 is a diagram of a Bragg filter time delay element in accordance with a first embodiment of the present invention.
Figure 2:
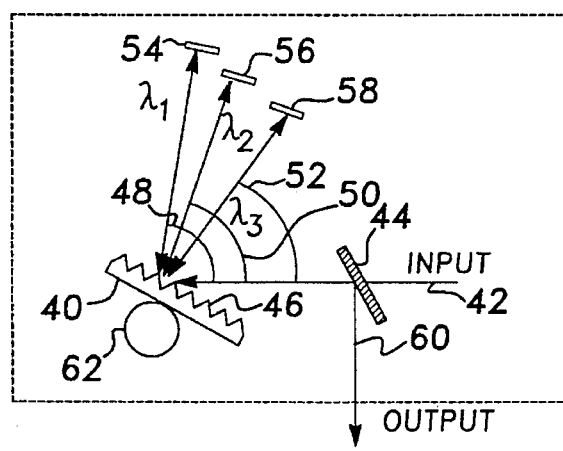
FIG. 2 is a diagram of a wavelength addressed optical time delay generator used in the second embodiment of the present invention.
Figure 3:
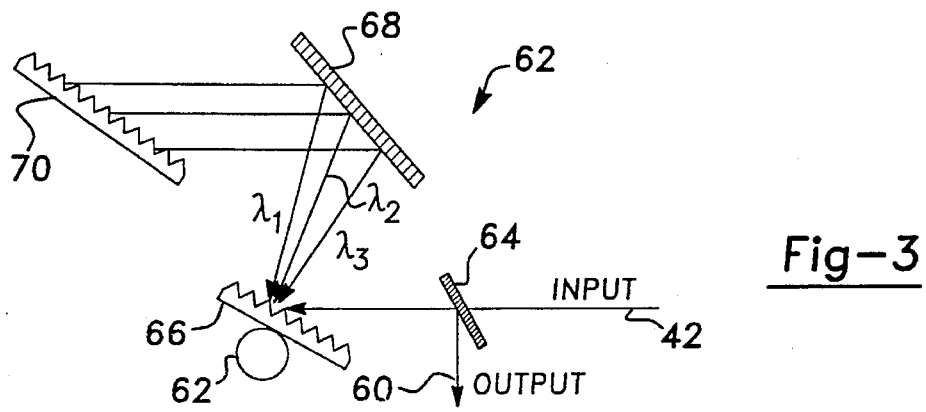
FIG. 3 is a wavelength addressed optical time delay generator used in the third embodiment of the present invention.

The present invention is a technique for performing wavelength selectable optical signal processing. Optical signal distribution may be required, for example, steering the radiation pattern of a phased array antenna. The invention utilizes a time delay unit in which the wavelength chosen determines the amount of the delay. Three preferred embodiments of the time delay units having this characteristic are shown in FIGS. 1, 2 and 3. In FIG 1 a time delay unit 10 includes an input fiber 12, coupler 14, a delay fiber 16, and an output fiber 18. An input light beam 20 is transmitted through both the input fiber 12 and the coupler 14 before entering the delay fiber 16.

Coupler 14 may comprise, for example, a beamsplitter which will substantially transmit light passing through it from the input fiber in the direction of arrow 20. However, coupler 14 will reflect, at a 90 degree angle, light entering from the optical fiber 16, as described in more detail below. The coupler may also comprise a fiber optic circulator such as the types available from Optics For Research of Caldwell, N.J. Input beam 20 may comprise, for example, two simultaneous pulses of wavelengths λ1 22 and λ2 24.

Delay fiber 16 contains a series of reflective gratings 26–34 spaced at interval along its length. Each of the gratings 26–34 are configured to be reflective at a different wavelength. In this example, filter number one 26 reflects light of wavelength λ1 and transmits other wavelengths. Likewise, filter number two 28 reflects light of wavelength λ2 and transmits light of other wavelengths. As a result, light of wavelength λ1 will travel from coupler 14 along delay fiber 16 only as far as the first filter 26 and will be reflected back to the coupler. Because of the beamsplitter in coupler 14, this λ1 light will then be reflected at a ninety degree angle into output fiber 18 where it comprises a portion of output beam 36.

The portion of input beam 20 which is of wavelength λ2 will traverse the delay fiber 16 until it reaches the second filter 28, whereupon it will be reflected back to the coupler 14, and then down output fiber 18. Due to the longer total path length of the λ2 light as compared to the λ1 light, the λ2 light will reach output fiber 18 at a later time than the λ1 light. This is illustrated in the graph of output beam 36 which shows the λ1 pulse proceeding the λ2 pulse in time. Likewise, filters 30, 32 and 34 are configured to reflect light of other selected wavelength and transmit all other wavelengths. In general, the time delay unit 10 will produce a time delay equivalent to 2 dn/c, where d is the distance from the fiber input to the appropriate grating 26–34 and c/n is the speed of light in the fiber.

An absorber 37 is disposed at the end of the optical fiber 16 to prevent "ghost" refections from the fiber end facet of any portions of optical beams that are transmitted through all of the filters 26–34. This relaxes the reflectivity requirements of the filters, since the reflectivity can be less than 100%.

In a preferred embodiment, the reflective gratings 26–34 are very narrow band optical Bragg reflection filters with optical filter bandwidths corresponding to a desired RF bandwidth. These Bragg filters 26–34 are actually formed directly in the core of the optical fiber 16 so that no splices or connectors are required for the filter.

In a preferred embodiment, the Bragg refection filters 26–34 are formed in the core of a continuous piece of fiber using the photosensitive properties of germanium doped (GeO GeO$_2$) fiber. It has been reported that exposure to ultraviolet light in narrow wavelength band centered about 244 nanometers, associated with an oxygen-vacancy defect in the germanium compound will cause a permanent change in the local refractive index. See G. Meltz, W. Morey and W. Blenn, "Formation of Bragg Gratings in Optical Fibers by a Transverse Holographic Method", *Opt. Lett.* 14, 823 (1989), which is hereby incorporated by reference.

Referring now to FIG. 2, a second embodiment of a wavelength selectable optical delay unit 38 is shown. In this embodiment, a dispersive optical element 40 instead of the optical delay fiber 16 is utilized. In more detail, an input light beam 42 enters the delay unit 38 and passes through a beamsplitter 44 configured to transmit this input beam, whereupon it reaches the dispersive optical element 40. The dispersive optical element 40 has a dispersive surface 46 which may comprise a diffraction grating. Light of a first wavelength λ1 will be dispersed by the dispersive element 40 at a first angle 48. Light of a second wavelength λ2 will be dispersed and reflected at a second angle 50 and light at a third wavelength λ3 will be reflected by dispersive element 40 at a third angle 52.

Three mirror elements 54, 56, 58 are disposed at different distances from the dispersive element 40 and also are disposed such that light reaching them from the dispersive element 20 is incident perpendicularly to them. As a result, light of wavelengths λ1, λ2 and λ3 are reflected back on themselves to the dispersive element 40, but each will have travelled different distances. It will be appreciated that the three mirrors 54, 56 and 58 could be incorporated into a single appropriately shaped unit, such as a spherically shaped optical reflector to realize a continuum of optical delays with changing wavelengths. The light reflected (from mirrors 54, 56 and 58) back to the dispersive element 40, also is reflected back along its original path to the beamsplitter 44. This beamsplitter 44 has a reflective surface on the side facing the dispersive element 40 to cause this light to be substantially reflected along the path of output beam 60. It will be appreciated by those skilled in the art that other efficient ways of directing the input and output beams exists, besides using beamsplitters. For example, polarization schemes, etc. may be used.

As a result, the time delay introduced by the time delay unit 38 shown in FIG. 2 between the input beam 42 and output beam 60 will be a function of the wavelength. As the wavelength of the input is changed, the optical path it traverses will also change. The precise amount by which the beam is delayed at a particular wavelength can be altered in a number of ways. For example, a rotatable mounting 62 maybe employed. That is, by varying the angle of incidence of the input beam 42 with the dispersive element 40, the angle of reflection 40, 50, and 52 can be changed for any given wavelength. Alternatively, the direction of the input beam 42 could be altered. A further alternative is to utilize a reconfigurable dispersive element to permit the wavelength/angle relationship to be altered. Such a reconfigurable dispersive element maybe a real-time holographic element, or a conventional detraction grating overcoated with a material having a refractive index that can be modulated.

Referring now to FIG. 3, a third embodiment of a time delay unit 62 is shown in accordance with the present invention. The beamsplitter 64 and dispersive element 66 are the same as the those shown in FIG. 2. However, in FIG. 3 the three mirrors 54, 56 and 58 have been replaced by a single mirror 68 which reflects light from the three wavelength bands λ1, λ2 and λ3 onto an array of retro-reflectors 70 which serve to reflect light directly back from the direction of incidence. In this way, it can be seen that the path of light of wavelength λ1 as it proceeds from dispersive element 66 to the mirror 68 to the retro-reflector 70 and back again is a longer path than for light of wavelength λ3. In this way, wavelength selectable delay is achieved.

Figure 4:
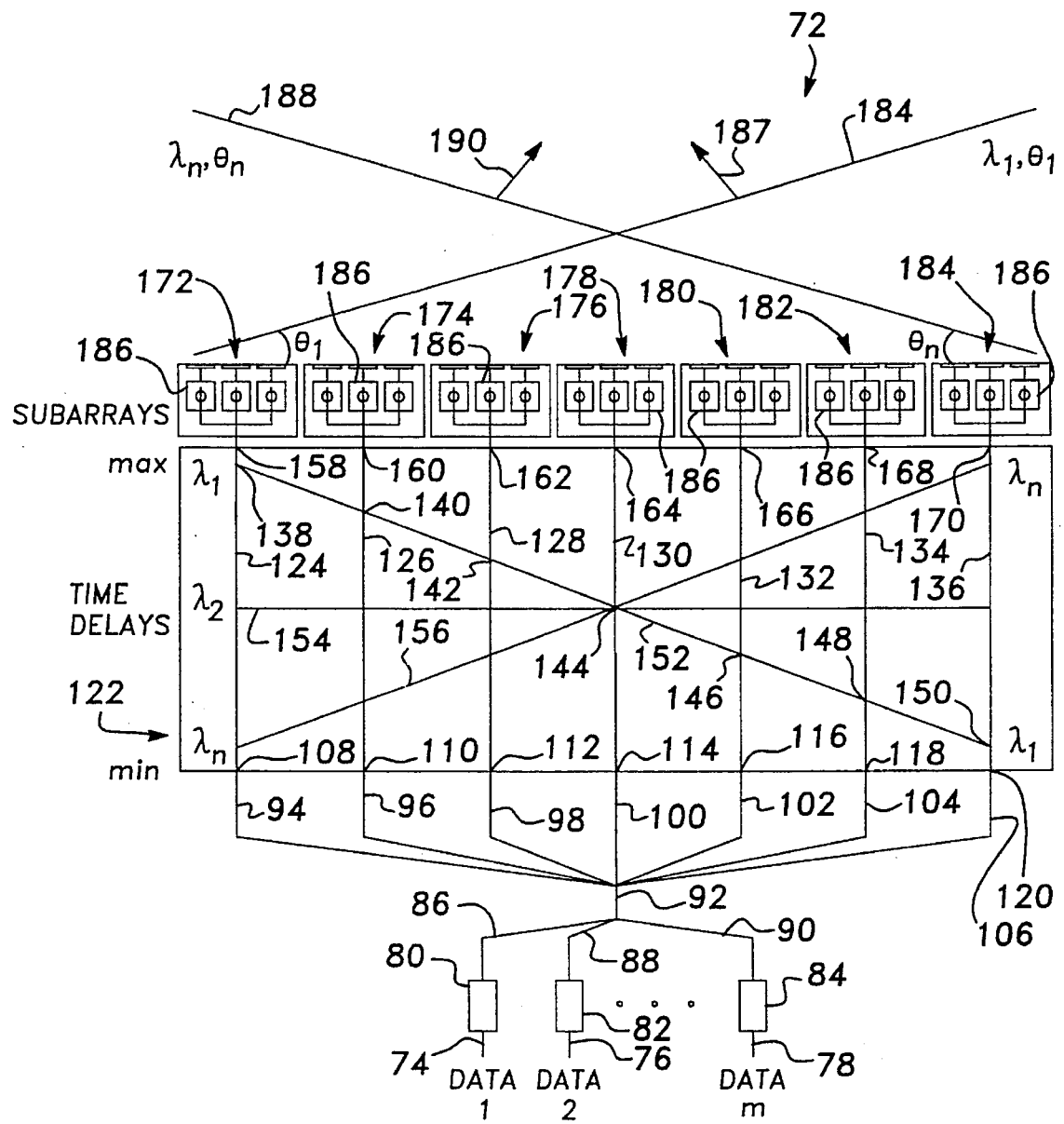
FIG. 4 is a diagram of a phased-array RF antenna utilizing wavelength control beam steering in accordance with one embodiment of the present invention.

Referring now to FIG. 4, a first embodiment of the present invention employing one of the aforementioned time delay units is shown. This embodiment comprises an RF phased-array antenna system 72. This RF phased-array antenna utilizes wavelength controlled beam steering. This is made possible by the use of a series of a time delay units, such as the time delay unit 10 shown if FIG. 1. However, it will be appreciated that the phased-array antenna 72 could also achieve the same advantages by use of the alternative time delay units 38 and 62 shown in FIG. 2 and 3 respectively.

As will be discussed in more detail below, the RF phased-array antenna 72 utilizes wavelength controlled beam steering to establish a one-to-one correspondence between antenna beam direction and optical carrier wavelength. This allows the antenna beam to be steered simply by changing the optical carrier wavelength. This represents a significant simplification over conventional beam steering controlled systems, where the true time delay unit of each antenna subarray must be switched individually by a control distribution network that may be independent of the signal distribution network according to the desired antenna beam direction. In addition, as will be explained in more detail below, this method allows independent multi-channel operation by wavelength-division multiplexing (WDM) of various RF signals onto different optical carriers. One simply chooses the optical carrier wavelength for a given RF signal according to the beam direction. Modulated carriers are combined optically and sent to the same delay hardware. The true time delay units act as optical switches whose combined effect is to route the RF signals independently and into various free space directions where the routing information is contained in the optical carrier wavelengths.

In more detail, a plurality of different RF signals 74, 76 and 78 are converted into optical carrier signals of different wavelengths by a plurality of lasers 80, 82 and 84. These lasers may comprise tunable or single frequency lasers capable of producing a desired wavelength. For example, the lasers may comprise the MicraLase manufactured by Microcord of Concord, Mass. or the model TSL-80 manufactured by Santec of Sandiebrook, N.J. The output of the lasers 80–84 are fed through optical fibers 86, 88 and 90 to a coupler unit 92. The individual optical signals from optical fibers 86, 88 and 80 are combined into a single light beam in the coupler unit 92 and then split into a plurality of identical optical signals which are directed along time delay input fibers 94, 96, 98, 100, 102, 104 and 106. It should be noted that each of these input fibers 94–106 will carry an identical optical signal. This may comprise, for example, a signal from only one of the lasers 80–84 or from a plurality, or from all of the lasers 80–84. It will be appreciated that additional lasers may be provided depending on the requirements of the particular application. The optical signals from input fibers 94–106 are fed to input ports 108, 110, 112, 114, 116, 118 and 120 respectfully which allows the optical signals to enter the time delay unit 122.

Time delay unit 22 contains a plurality of individual delay elements such as the delay element 10 shown in FIG. 1. In this example, there are seven delay elements 124, 126, 128, 130, 132, 134 and 136. These delay elements each comprise all of the components of delay element 10 including input fiber 12, coupler 14 delay fiber 16 and output fiber 18. In this example, there are a variable number of lasers (three lasers 80–84 are shown) and each delay fiber in the time delay elements 124–136 contain a variable number of Bragg filters. In more detail, the Bragg filters reflecting the λ1 wavelengths are disposed at linearly varying positions along the elements 124–136. That is, the λ1 Bragg filters are disposed at points 138, 140, 142, 144, 146, 148 and 150. In other words, the λ1 Bragg filters occur at the points where an imaginary line 152 intersects the delay units 124–136. Likewise, the λ2 wavelength filters will lie along the intersection between imaginary line 154 and the delay units 124–136. Also the λ1 Bragg filters will occur at the intersection of imaginary line 156 and the delay units. 124–136. For simplicity of illustration, only the delay fibers in the delay units 124–136 are illustrated. Also, the full path of the optical beam through each of the delay elements 124–136 is not shown. Actually this path will be from the input ports 108–120 up to the Bragg filter of the particular wavelength and back down to the coupler (not shown) near the input port 108–120 and then upward again along an output fiber (not shown) to the time delay unit outputs 158, 160, 162, 164, 166, 168 and 170.

From analysis of the arrangement of the Bragg filters in the time delay unit 122 it can be seen that the time delay unit will produce a linear taper delay pattern which depends on wavelength. That is, for λ1 the leftmost delay element 124 will produce the longest delay and succeeding delay elements will produce proportionately less delay. The far right delay element 136 will produce the least amount of delay. Conversely, the leftmost delay element 124 will produce a minimal delay for a λn signal with the amount of delay increasing across the successive delay elements 124–136. The last delay element 136 will produce the longest delay for An wavelengths. For λ2 wavelengths the amount of delay will be the same across each delay element 124–136. It is this pattern of delay which will be utilized by the RF array antenna 72 to produce wavelength controlled beam steering.

Each output port 158–170 in the time delay module 122 is fed into one of the antenna subarrays 172, 174, 176, 178, 180, 182 and 184 through a series of photodetectors (not shown) to convert the optical signals into electrical form. Each subarray comprises a plurality of identical antenna elements 186 of which three are depicted in each of the antenna subarrays 172–184. One could, in principle, equip each antenna radiating element with an optical true time delay device of the type discussed herein. In this particular illustration, a hybrid approach is shown wherein steering is performed at the subarray level by optical true time delay, and at the element level within each subarray using electronic phase shift steering. The electronic phase shifters in the subarrays 172–184 will produce phase delay in the individual antenna elements 186 to cause that subarray output to match the desired taper. For example, the taper matching the angle Θ, of line 184 (λ8) may be produced by the electronic phase shifters for transmission in direction 187 through the λ1 optical carrier.

In more detail, for λ1 wavelengths traversing the time delay unit 122, plane wave 184 will be generated. This is because the signal coming from the leftmost delay element 124, will delay the signal the most while that from the rightmost delay unit 136 will delay the plane wave signal the least. Intervening delay units will delay the signal proportionately between these extremes. Plane wave 184 will therefore have a taper as shown and will be directed in direction shown by arrow 187. Conversely, the wavelength λn signal will have the least delay on the leftmost portion traversing delay element 124 and the most delay occurring at the rightmost portion traversing delay element 136. This will produce a plane wave 188 (λn Θn) which will be directed in the direction of arrow 190 at angle Θ.

In this way, the direction of the beam transmitted by RF phased-array antenna 72 can be controlled by simply changing the wavelength of the optical signal from the laser 80, 82 or 84. In some cases it may be desirable to simultaneously transmit different signals in different directions. In this case, plurality of lasers 80–84 would operate at different wavelengths simultaneously. However, it will be appreciated that within subarrays 172–184 electronic phase shifters can only steer the beam in a single direction at a time. If it is desirable to have simultaneous transmission in multiple beam directions, then optical wavelength controlled beam steering as produced by the time delay unit 122 must be utilized for each antenna subelement 186. One approach, for example, would be to provide an individual element 124–136 for each subarray 186 having the appropriate positioning of the Bragg filter to produce the desired taper for that optical carrier wavelength. This will permit the implementation of independent multi-channel operation by wavelength-division multiplexing (WDM) of the various RF signals 74–78 into different optical carriers. It should also be noted that more complex beam forming can be realized by non-linear time delay tapers. This would be useful for example in conformal antennas, where the antenna conforms to the skin of an aircraft and is not flat, but is curved. In this case, the desired time delay would be calculated based on the location of each element at each point along the aircraft skin for each beam direction and the Bragg gratings would be placed accordingly.

Figure 5:
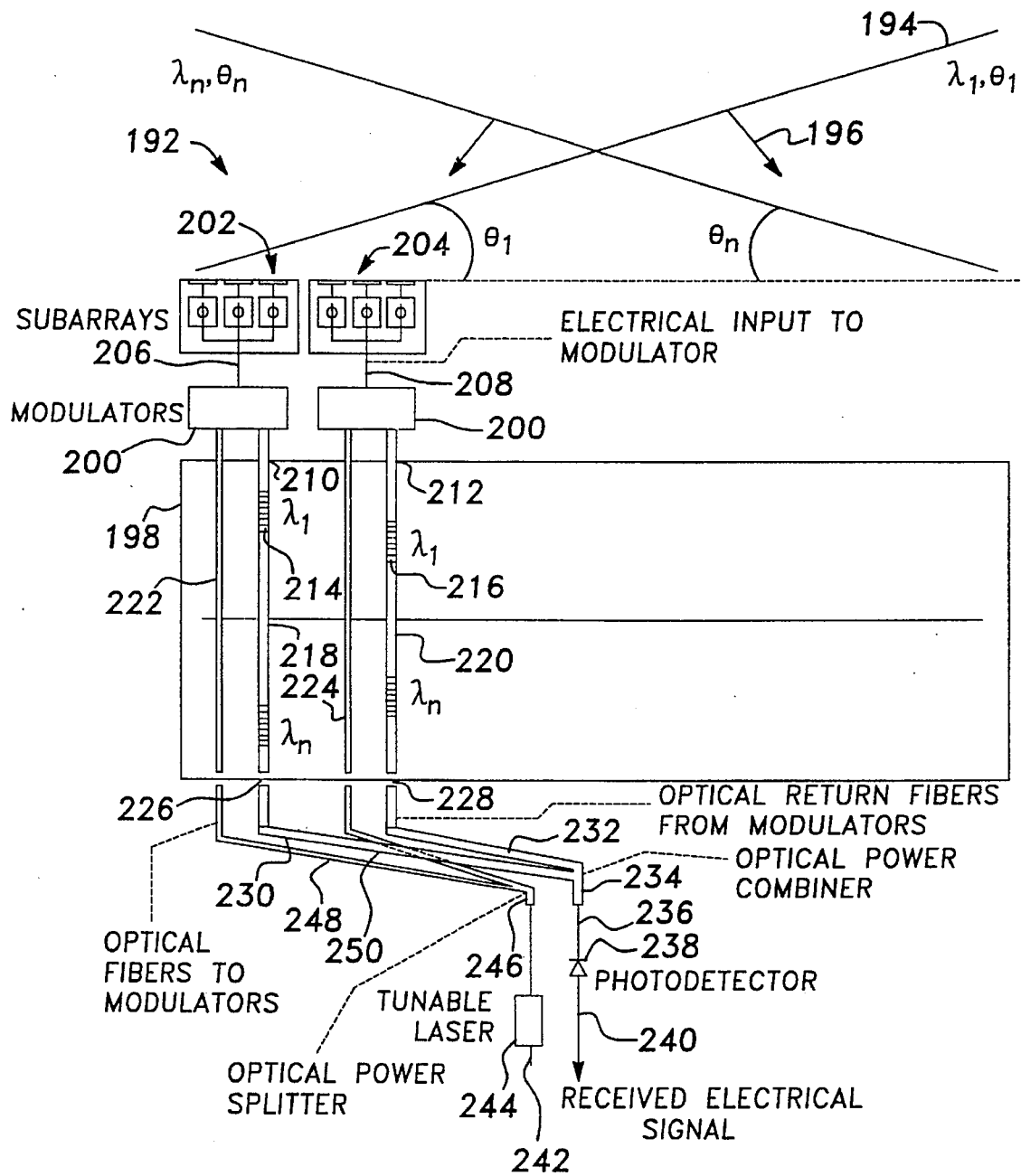
FIG. 5 is a diagram of the wavelength controlled beam steering phased-array antenna shown in FIG. 4 adapted for receive mode operation.

Referring now to FIG. 5, an RF phased-array antenna 192 in accordance with the present invention is shown. In this case the antenna is adapted for both transmit and receive modes of operation. In the receive mode operation it is desired to steer the receiving antenna to receive plane waves from particular directions. For example, to receive the plane wave 194 (λ, Θ) from direction defined by arrow 196 and angle Θ, the λ1 optical carrier is used. This is generated by the tunable laser 244, selected by the control line 242 and transmitted to the modulator 200. The modulator 200 receives the electrical signal from the subarrays 202 and 204 through the input lines 206 and 208 respectively. Also, it will appreciated that in transmit mode, the modulators 200 are replaced by photodetectors for transforming optical signals received from the time delay unit 198 into electrical signals, which are then transmitted to the subarrays in the transmit mode.

In the receive mode, the laser output producing, for example the λ1 wavelength, is transmitted into the time delay unit at the receive mode input ports 210 and 212. Due to the position of the Bragg reflectors for λ1 214 and 216, the desired delay is generated along these lines. That is, a small amount of delay is generated at the leftmost time delay unit 218 and a longer delay is generated in successive sections of the time delay unit 198 down to the rightmost delay element (not shown). Time delay unit 198 also contains transmit mode delay elements, of which only 222 and 224 are illustrated. These are identical to the time delay elements for the transmit only system shown in FIG. 4.

In the receive mode, the appropriately delayed optical signals leave the time delay unit 198 through output ports 226 and 228 and travel along optical fibers 230 and 232 to optical power combiner 234. Optical power combiner 234 combines all of the received signals into a single output signal along line 236 which is then received by photodetector 238 and converted into an electrical signal along line 240. For transmit mode, RF signal along data line 242 is converted to an optical carrier signal of the appropriate wavelength by tuneable laser 244 which is combined with other optical signals by the optical coupler 246. Equal portions of the signal are thereby directed to the time delay unit 198 along optical fibers 248 and 250 as described in connection with FIG. 4. The wavelength controlled beam steering technique taught by the present invention is an important enabling technology for optically feed and controlled phased-array antennas. It is particularly useful for insertion into satellite communications antennas that will serve the continually growing bandwidth demands of personal communications networks. Satellite antenna require high gain, which requires high RF operating frequencies. This, in turn, calls for an optical distribution network, as opposed to conventional electrical networks which become unacceptably lossy and bulky at high frequencies. Satellite antennas also will benefit from the reduced weight of the optical feed network of the present invention as well as weight savings associated with the elimination of mechanical gimbals. Further, the multichannel wavelength division multiplexing nature of the beam steering concept of the present invention can allow simultaneous multiple beam operation, which is essential for maximizing capacity in a communications satellite antenna. Thus the optical feed network of the present invention will be able to not only address multiple users, but can even transmit different messages within the same RF band to users at different locations.

Figure 6:
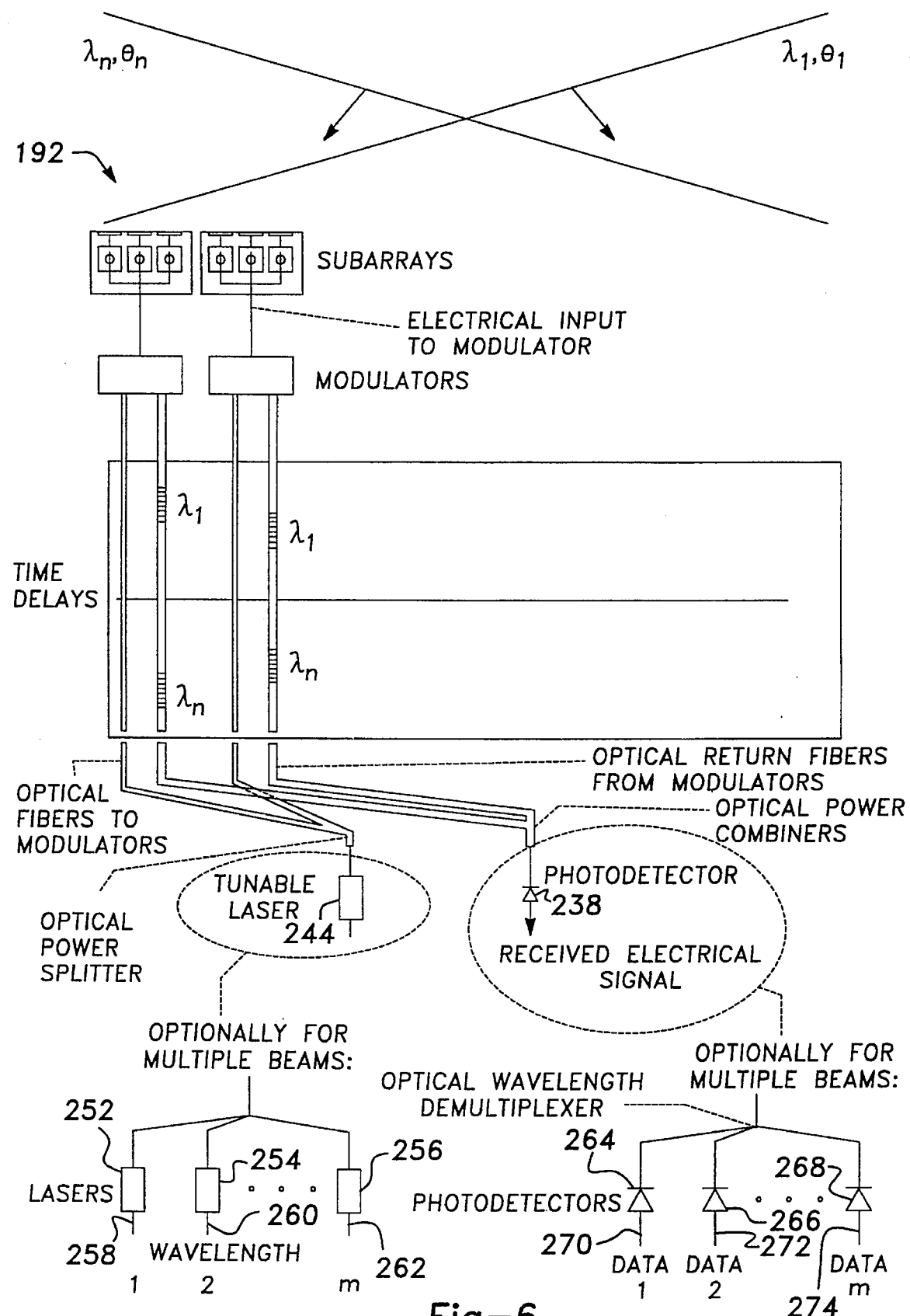
FIG. 6 is a diagram of the wavelength controlled beam steering RF antenna configured for multiple simultaneous beam operation.

Referring now to FIG. 6, a modified version of an RF phased-array antenna 192 is shown. In this version, the antenna could be adapted for simultaneous transmit and receive operation of multiple beams. Thus, in the receive mode, tuneable laser 244, also shown in FIG. 5, is replaced by a plurality of lasers 252, 254 and 256 to permit multiple simultaneous RF signals to be received from locations determined by the set of wavelengths selected for lasers 252–256. This is similar to the configuration shown in FIG. 4. In the receive mode, photodetector 238, also shown in FIG. 5, is replaced by a plurality of photodetectors 264, 266, and 268 each which produce an outputs along data lines 270, 272 and 274 respectively.

Figure 7:
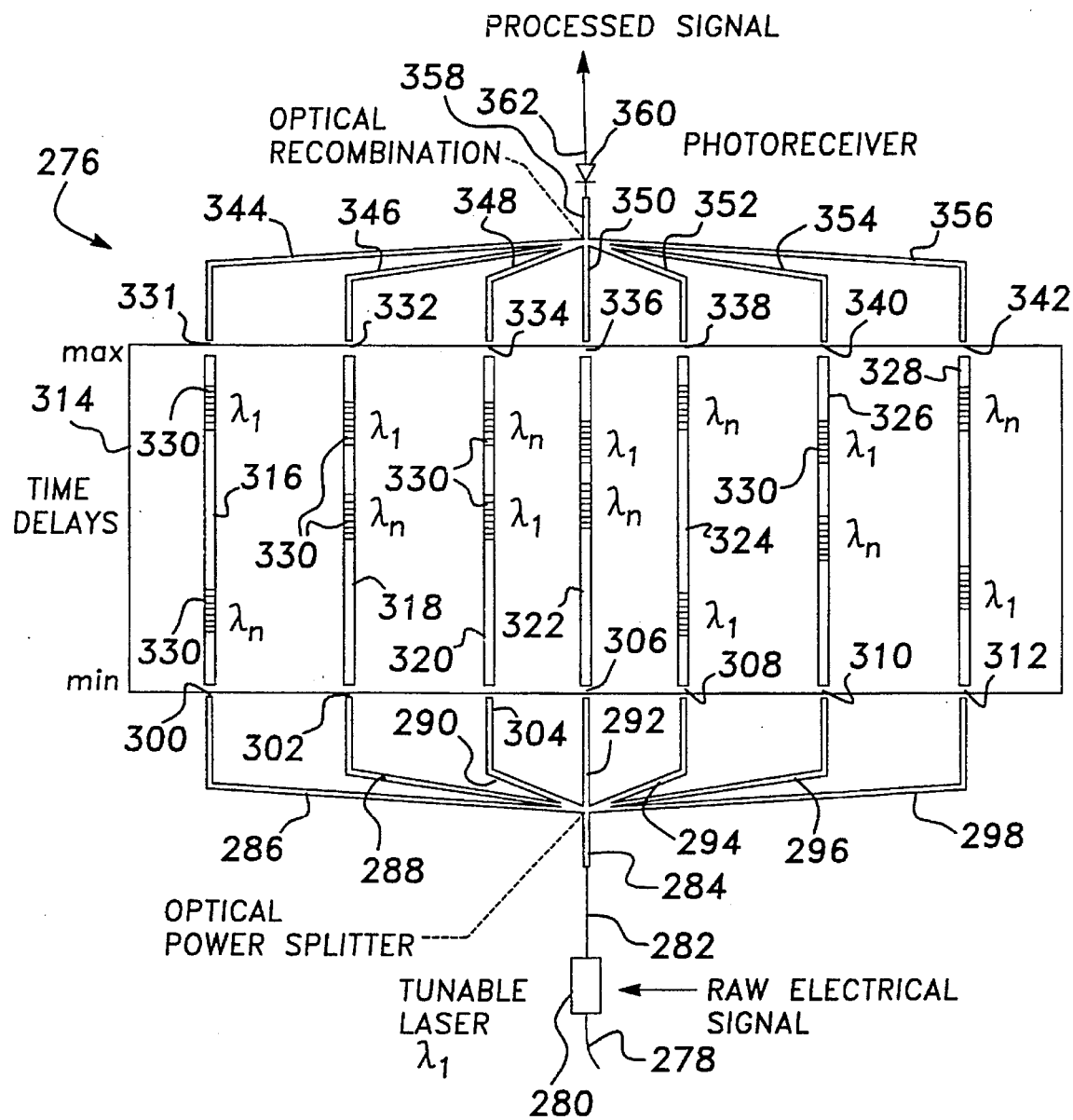
FIG. 7 is a diagram of the wavelength-selectable optical signal processing system in accordance with the present invention.

Referring now to FIG. 7, a general purpose wavelength-selectable optical signal processing system 276 in accordance with the present invention is shown. This system utilizes a time delay unit in accordance with the present invention similar to the one discussed above in connection with FIGS. 4, 5 and 6. In the previously discussed RF phased-array antenna applications, the delayed signals are combined in the spatial domain by transmission from separate antenna subarray apertures to form a wavefront whose orientation is determined by the principle of Huygen's superposition. In the wavelength-selectable optical signal processing system 276 shown in FIG. 7, however, the delayed optical beams are recombined in the time domain to construct a superposition of time-delayed signals.

One application for this kind of optical signal processing is in the area of temporal signal processing in which frequency filtering can be simulated by weighting a signal at different points with different weights. These would include, for example, transversal (time-domain) filters such as, SAW and BAW devices. However, in conventional devices of this type at wide bandwidths (such as 10's of GHz wide) and at high frequencies (such as 20 GHz)these approaches break down due to high losses suffered by electrical signals at high frequencies. Further, at high frequencies conventional acoustic devices cannot operate.

In more detail, optical signal processor 276 receives a raw electrical signal 278 which is directed to a tuneable laser 280. The electrical signal modulates the tuneable laser at a preselected frequency to produce a modulated optical beam 282. This beam then enters an optical power splitter 284 whereupon the light is directed equally into seven separate optical fibers 286, 288, 290, 292, 294 and 296. These optical fibers are directed into seven input ports 300, 302, 304, 306, 308, 310 and 312 of the time delay module 314. The time delay 314 is composed of an arbitrary number of optical time delay elements 316, 318, 320, 322, 324, 326 and 328. Each optical element 316–328 is similar to the optical delay element 10 shown in FIG. 1, and includes an input fiber, coupler, delay fiber and output fiber, although only the delay fiber is illustrated for sake of simplicity.

Each delay element 316–328 has a plurality of Bragg filters 330 generated on them. As shown in FIG. 7, the filters appearing at the upper portion of time delay module 314 will produce the longest path, and therefor the greatest delay, while filters appearing at the bottom portion of time delay unit 314 will produce the least delay. The particular location of the Bragg filters, for any given wavelength, will be determined by the delay pattern that is desired to be imposed on the processed signal to achieve the desired effect. It is also notable that a plurality of Bragg filters each reflecting different wavelengths can be employed on each delay element 316–328. Thus, the particular delay pattern imposed on the signal can be altered simply by changing the optical wavelength of the tuneable laser 280. The time delay unit 314 includes a series of output ports 331, 332, 334, 336, 338, 340 and 342. These output ports are connected to optical fibers 344, 346, 348, 350, 352, 354 and 356. All of the output fibers 344-356 converge on an optical recombiner 358, which combines all of the separate optical signals into a single signal, which is then received by a photo detector 360 for conversion back into a processed electrical signal 362.

In operation, it may be desirable to form different processing functions on the same signal at different times. Thus, at a given time, by tuning the tuneable laser 282 to a first optical frequency, the electrical signal 278 is processed in accordance with a particular set of time delays producing the processed signal 362. At a different time, it may be desirable to process the same or a different signal with a different signal processor function. Now, by simply changing the wavelength of the tuneable laser 280 to the appropriate wavelength, a different signal processing function will be performed since the light of the different wavelength will be reflected with different delays by the delay units 316–328. As a result, the wavelength selectable optical signal processor 276 is an agile time domain type signal processor implemented using a wavelength-reconfigurable transversal filter design which can operate at higher frequencies and bandwidths than conventional traversal time domain filters.

It is notable that the time delay module 314 in FIG. 7 is quite similar to the time delay unit disclosed in FIGS. 4–6 for performing wavelength controlled beam steering in RF phased-array antennas. Thus, it can be seen that the task of controlling the beam steering in a phased-array RF antennas, in accordance with the present invention is essentially a signal processing function.

From the foregoing it can be seen that the present invention provides wavelength-selectable optical signal processor. It is passive, relatively simple, compact and inexpensive. The present invention provides particular advantages when used in RF phased-array antennas and when used as a wavelength-reconfigurable traversal filter. Those skilled in the art can appreciate that other advantages can be obtained from the use of this invention and that modification may be made without departing from the true spirit of the invention after studying the specification, drawings and following claims.

What is claimed:

1. An optical delay processor comprising:

a plurality of input means each receiving an identical portion of a modulated optical beam, the optical beam having a predetermined wavelength;

a succession of optical delay pathways each coupled to one of said input means, wherein the distance each beam traverses through each delay pathway varies as a function of said predetermined wavelength of the optical beam, and wherein said distance for any one of said predetermined wavelengths creates a predetermined delay pattern across said succession of optical delay pathways.

2. The optical time delay processor of claim 1 wherein said distance for a first wavelength varies linearly from a maximum for the first optical delay pathway in said secession to a minimum for the last delay pathway in said succession.

3. The optical time delay processor of claim 2 wherein said distance for a second wavelength varies linearly from a minimum for the first optical delay pathway to a maximum for the last optical delay pathway in the succession.

4. The apparatus of claim 1 wherein said distance for said predetermined wavelengths varies non-linearly across said succession of optical delay pathways.

5. The optical delay processor of claim 1 wherein said optical delay pathways further comprise:

optical coupler means including input, output and interface points, said coupler means receiving said optical signal from said input means at said coupler input point and routing it out of said coupler at said interface point, said coupler means also directing optical signals entering said interface point out of said coupler at said output point; and time delay unit coupled to said coupler interface point for directing said optical signal along a path and reflecting the signal back to said interface point, the time delay unit comprising an optical fiber having reflective elements spaced at intervals along said fiber, said reflecting elements reflecting light received from said interface point and back to said interface point, said reflective elements reflecting light received from said interface point and back to said interface point, said reflective elements each substantially reflecting a different band of wavelengths, wherein different wavelengths of light travel optical paths of different lengths within said optical fiber.

6. The apparatus of claim 5 wherein said coupler means includes a beamsplitter.

7. The apparatus of claim 5 wherein said reflector elements comprise reflective gratings.

8. The apparatus of claim 7 wherein said reflective gratings are Bragg reflective gratings formed inside said optical fiber.

9. The apparatus of claim 5 wherein said fiber includes an absorber at the end opposite said second interface point for preventing reflections from said opposite end.

10. The optical delay processor of claim 1 wherein said optical delay pathways further comprises:

optical coupler means having input, output and interface points, said optical coupler receiving said optical signal from said input means at said coupler input point, and routing it out of said coupler at said interface point, said coupler means also directing optical signals entering said interface point out of said coupler at said output point;

time delay unit coupled to said coupler interface point for directing said optical signal along a path and directing said signal back to said interface point, the time delay unit including a dispersive element for reflecting said optical signal at an angle that is a function of the wavelength of the optical signal, said time delay unit including a reflecting means for reflecting said optical signal back to said dispersive element along an optical path whose length is a function of said angle, wherein the total path length of said optical signal in said time delay unit depends on its optical wavelength; and light output means coupled to said coupler output point, whereby the total time it takes said optical signal to travel from said input means to said output means depends on its wavelength.

11. The apparatus of claim 10 wherein said dispersive element is a diffraction grating.

12. The apparatus of claim 10 wherein said reflecting means includes a plurality of mirrors spaced at different locations and distances from said dispersive element, and wherein each mirror receives light reflected from said dispersive element at selected angles.

13. The apparatus of claim 10 wherein said reflecting means includes a mirror receiving light reflected from said dispersive element, and a retroreflector for reflecting light from said mirror back toward said mirror.

14. The apparatus of claim 10 wherein said reflecting means comprises a monolithic mirror of multiple mirror surfaces.

15. A phased array antenna system comprising:

a plurality of antenna elements arranged in an array;

signal input means for receiving at least one electrical data signal;

means for converting said electrical data signal into a modulated optical signal;

an optical delay processor coupled to said array, said optical delay processor including a plurality of input means each receiving an identical portion of a modulated optical beam, the optical beam having a predetermined wavelength, and a succession of optical delay pathways each coupled to one of said input means, wherein the distance each beam traverses through each delay pathway varies as a function of said given wavelength of the optical beam, and wherein said distance for any one of said given wavelengths creates a predetermined delay pattern across said succession of optical delay pathways;

output means coupled to said delay pathway outputs; means for coupling said modulated optical signal to each of said inputs in said optical delay processor;

means for converting said optical delay processor output into electrical signals; and means for coupling said electrical signals derived from said optical delay processor output to said antenna elements, whereby said antenna elements receive said electrical signals in said predetermined delay pattern.

16. The phased array antenna of claim 15 wherein said distance for a first wavelength varies linearly from a maximum for the first optical delay pathway in said secession to a minimum for the last delay pathway in said succession.

17. The phased array antenna of claim 15 wherein said distance for a second wavelength varies linearly from a minimum for the first optical delay pathway to a maximum for the last optical delay pathway in the succession.

18. The phased array antenna of claim 15 wherein said antenna elements comprise a conformal antenna and wherein said delay pattern is derived from the shape of said conformal antenna.

19. The phased array antenna of claim 15 wherein said signal means simultaneously receives a plurality of electrical data signals, and said means for converting produces simultaneously a plurality of modulated optical signals at different wavelengths, and wherein said antenna elements simultaneously receive a plurality of electrical signals and a plurality of delay patterns, whereby said antenna elements can direct multiple beams in multiple directions simultaneously.

20. The phased array antenna of claim 15 wherein said means for converting said electrical data signals into modified optical signals comprises a wavelength selectable tunable laser and wherein said predetermined delay pattern and resultant in beam direction is determined by the selection of the wavelength of the tuneable laser output.

21. The phased array antenna system of claim 15 wherein said optical delay processor further comprises:

optical coupler means including input, output and interface points, said coupler means receiving said optical signal from said input means at said coupler input point and routing it out of said coupler at said interface point, said coupler means also directing optical signals entering said interface point out of said coupler at said output point; and time delay unit coupled to said coupler interface point for directing said optical signal along a path and reflecting the signal back to said interface point, the time delay unit comprising an optical fiber having reflective elements spaced at intervals along said fiber, said reflecting elements reflecting light received from said interface point and back to said interface point, said reflective elements reflecting light received from said interface point and back to said interface point, said reflective elements each substantially reflecting a different band of wavelengths, wherein different wavelengths of light travel optical paths of different lengths within said optical fiber.

22. The phased array antenna system of claim 15 wherein said optical delay processor further comprises:

optical coupler means having input, output and interface points, said optical coupler receiving said optical signal from said input means at said coupler input point, and routing it out of said coupler at said interface point, said coupler means also directing optical signals entering said interface point out of said coupler at said output point;

time delay unit coupled to said coupler interface point for directing said optical signal along a path and directing said signal back to said interface point, the time delay unit including a dispersive element for reflecting said optical signal at an angle that is a function of the wavelength of the optical signal, said time delay unit including a reflecting means for reflecting said optical signal back to said dispersive element along an optical path whose length is a function of said angle, wherein the total path length of said optical signal in said time delay unit depends on its optical wavelength; and light output means coupled to said coupler output point, whereby the total time it takes said optical signal to travel from said input means to said output means depends on its wavelength.

23. An optical signal processing system comprising:

a plurality of input means each receiving an identical portion of a modulated optical beam, the optical beam having a predetermined wavelength;

a succession of optical delay pathways each coupled to one of said input means, wherein the distance each beam traverses through each delay pathway varies as a function of said predetermined wavelength of the optical beam, and wherein said distance for any one of said predetermined wavelengths creates a predetermined delay pattern across said succession of optical delay pathways;

signal input means for receiving at least one electrical data signal;

means for converting said electrical data signal into a modulated optical signal;

means for coupling said modulated optical signal to each of said inputs in said optical delay processor;

means for combining the outputs of said optical delay pathways; and means for converting said combined optical delay processor output into output electrical signals whereby said predetermined delay pattern is imposed on said output electrical signals.

* * * * *